(12) United States Patent
Uhm et al.

(10) Patent No.: US 10,361,461 B2
(45) Date of Patent: Jul. 23, 2019

(54) CABLE TYPE SECONDARY BATTERY INCLUDING AN INNER ELECTRODE HAVING AN INTERNAL SEPARATOR BETWEEN ELECTRODES

(71) Applicant: LG Chem, Ltd., Seoul (KR)

(72) Inventors: In-Sung Uhm, Daejeon (KR);
Je-Young Kim, Daejeon (KR); Yo-Han Kwon, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/549,575

(22) PCT Filed: Feb. 11, 2016

(86) PCT No.: PCT/KR2016/001407
§ 371 (c)(1),
(2) Date: Aug. 8, 2017

(87) PCT Pub. No.: WO2016/129939
PCT Pub. Date: Aug. 18, 2016

(65) Prior Publication Data
US 2018/0034108 A1 Feb. 1, 2018

(30) Foreign Application Priority Data
Feb. 9, 2015 (KR) .................. 10-2015-0019709

(51) Int. Cl.
*H01M 4/00* (2006.01)
*H01M 10/0587* (2010.01)
(Continued)

(52) U.S. Cl.
CPC ..... *H01M 10/0587* (2013.01); *H01M 2/0267* (2013.01); *H01M 4/662* (2013.01);
(Continued)

(58) Field of Classification Search
CPC ......... H01M 10/0587; H01M 10/0422; H01M 10/0431; H01M 10/0525; H01M 10/052;
(Continued)

(56) References Cited

U.S. PATENT DOCUMENTS

| 6,174,625 B1 | 1/2001 | Yamahira et al. |
| 2012/0058376 A1 | 3/2012 | Kwon et al. |

(Continued)

FOREIGN PATENT DOCUMENTS

| EP | 2830144 A1 | 1/2015 |
| JP | S5231334 A | 3/1977 |

(Continued)

OTHER PUBLICATIONS

Search report from International Application No. PCT/KR2016/001407, dated May 25, 2016.
(Continued)

*Primary Examiner* — Raymond Alejandro
(74) *Attorney, Agent, or Firm* — Lerner, David, Littenberg, Krumholz & Mentlik, LLP

(57) ABSTRACT

A cable type secondary battery includes an inner electrode support; and a sheet-like inner electrode—separation layer—outer electrode complex which is spirally wound around the outer side of the inner electrode support. The inner electrode—separation layer—outer electrode complex is formed such that an inner electrode, a separation layer, and an outer electrode are compressed integrally. According to one embodiment, an electrode and a separation layer are bonded integrally so that the separation layer in close contact with the electrode absorbs electrolyte so as to induce a uniform supply of the electrolyte to an outer electrode active material layer, thereby increasing the stability and performance of a cable type secondary battery. In addition, the cable type secondary battery has a sheet-like electrode, (Continued)

whereby the resistance of the cable type secondary battery is reduced and the performance of the battery may be improved.

39 Claims, 6 Drawing Sheets

(51) Int. Cl.
    H01M 4/75      (2006.01)
    H01M 10/058    (2010.01)
    H01M 2/02      (2006.01)
    H01M 4/66      (2006.01)
    H01M 4/74      (2006.01)
    H01M 4/78      (2006.01)
    H01M 10/04     (2006.01)
    H01M 10/0525   (2010.01)
    H01M 4/02      (2006.01)

(52) U.S. Cl.
    CPC .......... *H01M 4/663* (2013.01); *H01M 4/668* (2013.01); *H01M 4/74* (2013.01); *H01M 4/75* (2013.01); *H01M 4/78* (2013.01); *H01M 10/0422* (2013.01); *H01M 10/0431* (2013.01); *H01M 10/058* (2013.01); *H01M 10/0525* (2013.01); *H01M 2004/025* (2013.01); *H01M 2220/20* (2013.01); *H01M 2220/30* (2013.01)

(58) Field of Classification Search
    CPC .. H01M 10/058; H01M 2/0267; H01M 4/662; H01M 4/663; H01M 4/668; H01M 4/74; H01M 4/75; H01M 4/78; H01M 2004/025; H01M 2220/20; H01M 2004/30
    See application file for complete search history.

(56) References Cited

U.S. PATENT DOCUMENTS

| | | |
|---|---|---|
| 2014/0186672 A1 | 7/2014 | Kwon et al. |
| 2014/0227572 A1 | 8/2014 | Kwon et al. |
| 2014/0349158 A1 | 11/2014 | Kanemoto et al. |
| 2014/0370349 A1 | 12/2014 | Kwon et al. |
| 2014/0377613 A1 | 12/2014 | Kwon et al. |
| 2014/0377617 A1 | 12/2014 | Kwon et al. |
| 2015/0004498 A1* | 1/2015 | Cheng ............... H01M 2/145 429/247 |
| 2016/0301098 A1* | 10/2016 | He ................... H01M 10/0525 |
| 2017/0237109 A1 | 8/2017 | Kwon et al. |

FOREIGN PATENT DOCUMENTS

| | | |
|---|---|---|
| JP | H1069924 A | 3/1998 |
| KR | 20050099903 A | 10/2005 |
| KR | 2011-0089583 A | 8/2011 |
| KR | 20130040166 A | 4/2013 |
| KR | 20140047010 A | 4/2014 |
| KR | 20140132288 A | 11/2014 |
| KR | 20140132289 A | 11/2014 |
| KR | 101470555 B1 | 12/2014 |
| WO | 2005098994 A1 | 10/2005 |
| WO | 2013038946 A1 | 3/2013 |
| WO | 2016068683 A1 | 5/2016 |

OTHER PUBLICATIONS

Park el al., "All-Solid-State Cable-Type Flexible Zinc-Air Battery", Advanced Materials, vol. 27, No. 8, Dec. 23, 2014 (Dec. 23, 2014), pp. 1396-1401, XP055427837, DE.

Supplementary European Search Report for Application No. 16748479.8 dated Sep. 5, 2018, 4 pages.

Yo Han Kwon et al., "Cable-Type Flexible Lithium Ion Battery Based on Hollow Multi-Helix Electrodes", Advanced Materials, vol. 24, No. 38, Aug. 7, 2012 (Aug. 7, 2012), pp. 5192-5197, XP055124961.

* cited by examiner

CABLE TYPE SECONDARY BATTERY INCLUDING AN INNER ELECTRODE HAVING AN INTERNAL SEPARATOR BETWEEN ELECTRODES

CROSS-REFERENCE TO RELATED APPLICATIONS

The present application is a national phase entry under 35 U.S.C. § 371 of International Application No. PCT/KR2016/001407, filed Feb. 11, 2016, published in Korean, which claims the benefit of Korean Patent Application No. 10-2015-0019709, filed Feb. 9, 2015, with the Korean Intellectual Property Office, all of which are incorporated by reference.

TECHNICAL FIELD

The present disclosure relates to a cable type secondary battery, and more particularly, to a cable type secondary battery with high capacity and free shape adaptability.

BACKGROUND ART

Recently, a secondary battery is a device that stores electrical energy in chemical form and converts the stored chemical energy into electrical energy to generate electricity when needed. The secondary battery is also referred to as a "rechargeable battery" because it can be recharged repeatedly. A common secondary battery includes a lead accumulator, a NiCd battery, a NiMH accumulator, a Li-ion battery, and a Li-ion polymer battery. When compared to a disposable primary battery, not only is the secondary battery more economically efficient, it is also more environmentally friendly.

Secondary batteries are currently used in low power applications, for example, devices for assisting in the starting of car engines, mobile devices, tools, and uninterrupted power supply systems. Recent developments in wireless communication technologies have led to the popularization of mobile devices and have brought about a tendency to connect many types of existing devices to wireless networks. Under such circumstances, demand for secondary batteries is growing explosively. Hybrid vehicle and electric vehicle have been put into practical use in the aspect of environmental pollution prevention. These next-generation automobiles reduce in costs and weight and increase in their life span by employing technologies based on secondary batteries.

Generally, most secondary batteries have a cylindrical, prismatic, or pouch shape. This is because the secondary batteries are fabricated by mounting an electrode assembly composed of a negative electrode, a positive electrode and a separator in a cylindrical or prismatic metal can or a pouch-shaped case of an aluminum laminate sheet, and injecting an electrolyte into the electrode assembly. Thus, because a predetermined mounting space for the secondary battery is required, the cylindrical, prismatic or pouch shape of the secondary battery is a limitation in developing various shapes of mobile devices. Accordingly, there is a need for a new type of secondary battery that is easily adaptable in shape.

To fulfill this need, a linear battery having a very high ratio of length to cross-sectional diameter has been proposed. Korean Patent Publication No. 2005-99903 discloses a flexible battery including an inner electrode, an outer electrode, and an electrolyte layer interposed between the electrodes, but flexibility is not too good. Furthermore, the linear battery uses a polymer electrolyte to form the electrolyte layer, making it difficult for the electrolyte to permeate into an active material of the electrode, resulting in increased battery resistance and reduced capacity and cycle characteristics.

Also, in forming the cable type secondary battery, a non-uniform gap is created between the inner electrode and the outer electrode and the separation layer interposed between the electrodes, and due to this gap, feeding of an electrolyte solution into an outer electrode active material layer is not smooth, causing the battery performance to degrade.

Also, in case that a wire-type current collector is used in the cable type secondary battery, generally because line resistance is higher than sheet resistance, the wire-type current collector has higher resistance characteristics than a sheet-type current collector, causing the battery performance to degrade.

DISCLOSURE

Technical Problem

Therefore, the present disclosure is directed to providing a novel high-capacity secondary battery with a linear structure that is easy to adapt the shape, can maintain stability and outstanding performance of the secondary battery, and allows for easy permeation of an electrolyte into an active material of an electrode.

Technical Solution

To achieve the above object, according to an aspect of the present disclosure, there are provided cable type secondary batteries of the following embodiments.

A first embodiment relates to a cable type secondary battery including an inner electrode support, an inner electrode comprising a sheet-type first inner electrode formed such that it is spirally wound on an exterior of the inner electrode support, a sheet-type inner separation layer formed such that it is spirally wound on an exterior of the first inner electrode, and a sheet-type second inner electrode formed such that it is spirally wound on an exterior of the inner separation layer, an outer separation layer formed such that it is spirally wound on an exterior of the inner electrode, and an outer electrode formed such that it is spirally wound on an exterior of the outer separation layer.

A second embodiment relates to the cable type secondary battery according to the first embodiment, wherein the inner electrode support has an open structure in which a space is formed inside.

A third embodiment relates to the cable type secondary battery according to the first or second embodiment, wherein the inner electrode support is at least one spirally wound wire, at least one spirally wound sheet, a twisted wire, a linear wire, a hollow fiber, or a mesh-type support.

A fourth embodiment relates to the cable type secondary battery according to the third embodiment, wherein the hollow fiber is formed of at least one selected from the group consisting of polyethylene, polypropylene, polytetrafluoroethylene, polyvinylidenefluoride, polyacrylonitrile, polyimide, polyethyleneterephthalate, polyamide imide, polyester imide, polyether sulfone, and polysulfone.

A fifth embodiment relates to the cable type secondary battery according to any one of the first to fourth embodiments, wherein the first inner electrode comprises a first inner current collector and a first inner electrode active material layer formed on one surface of the first inner current collector, and the outer electrode comprises an outer current collector and an outer electrode active material layer formed on one surface of the outer current collector.

A sixth embodiment relates to the cable type secondary battery according to the fifth embodiment, further including a polymer film layer formed on at least one of the other surface of the first inner current collector and the other surface of the outer current collector.

A seventh embodiment relates to the cable type secondary battery according to the sixth embodiment, wherein the polymer film layer is formed of any one selected from the group consisting of polyolefin, polyester, polyimide and polyamide, or mixtures thereof.

An eighth embodiment relates to the cable type secondary battery according to any one of the fifth to seventh embodiments, wherein a polymer support layer is further formed on a surface of at least one of the first inner electrode active material layer and the outer electrode active material layer.

A ninth embodiment relates to the cable type secondary battery according to any one of the first to eighth embodiments, wherein the second inner electrode comprises a second inner current collector and a second inner electrode active material layer formed on both surfaces of the second inner current collector.

A tenth embodiment relates to the cable type secondary battery according to the ninth embodiment, wherein a polymer support layer is further formed on a surface of the second inner electrode active material layer.

An eleventh embodiment relates to the cable type secondary battery according to any one of the eighth to tenth embodiments, wherein the polymer support layer is a porous polymer layer having a pore size of from 0.01 μm to 10 μm and porosity of from 5% to 95%.

A twelfth embodiment relates to the cable type secondary battery according to any one of the eighth to eleventh embodiments, wherein the polymer support layer comprises a polar linear polymer, an oxide-based linear polymer, or mixtures thereof.

A thirteenth embodiment relates to the cable type secondary battery according to the twelfth embodiment, wherein the polar linear polymer is any one selected from the group consisting of polyacrylonitrile, polyvinyl chloride, polyvinylidene fluoride (PVDF), polyvinylidene fluoride-co-hexafluoro propylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate and poly-p-phenylene terephthalamide, or mixtures thereof.

A fourteenth embodiment relates to the cable type secondary battery according to the twelfth embodiment, wherein the oxide-based linear polymer is any one selected from the group consisting of polyethylene oxide, polypropylene oxide, polyoxymethylene and polydimethylsiloxane, or mixtures thereof.

A fifteenth embodiment relates to the cable type secondary battery according to any one of the first to fourteenth embodiments, wherein a width and a length of the inner separation layer and the outer separation layer are each larger than those of the first inner current collector, the second inner current collector, and the outer current collector.

A sixteenth embodiment relates to the cable type secondary battery according to any one of the fifth to fifteenth embodiments, wherein at least one of the first inner current collector, the second inner current collector and the outer current collector further comprises a primer coating layer comprising a conductive material and a binder.

A seventeenth embodiment relates to the cable type secondary battery according to the sixteenth embodiment, wherein the conductive material includes any one selected from the group consisting of carbon black, acetylene black, ketjen black, carbon fibers, carbon nanotubes and graphene, or mixtures thereof.

An eighteenth embodiment relates to the cable type secondary battery according to the sixteenth or seventeenth embodiment, wherein the binder is any one selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer and polyimide, or mixtures thereof.

A nineteenth embodiment relates to the cable type secondary battery according to any one of the fifth to eighteenth embodiments, wherein a plurality of recesses are formed on one surface of at least one of the first inner current collector, the second inner current collector and the outer current collector.

A twentieth embodiment relates to the cable type secondary battery according to the nineteenth embodiment, wherein the plurality of recesses have continuous patterns or intermittent patterns.

A twenty first embodiment relates to the cable type secondary battery according to the twentieth embodiment, wherein the continuous patterns are formed in a lengthwise direction, spaced apart from each other.

A twenty second embodiment relates to the cable type secondary battery according to the twentieth embodiment, wherein the intermittent patterns are formed of multiple holes.

A twenty third embodiment relates to the cable type secondary battery according to the twenty second embodiment, wherein the multiple holes are each circular or polygonal in shape.

A twenty fourth embodiment relates to the cable type secondary battery according to any one of the fifth to twenty third embodiments, wherein at least one of the first inner current collector, the second inner current collector and the outer current collector is a film-type current collector or a mesh-type current collector.

A twenty fifth embodiment relates to the cable type secondary battery according to any one of the fifth to twenty fourth embodiments, wherein at least one of the first inner current collector, the second inner current collector and the outer current collector is made of stainless steel; aluminum; nickel; titanium; fired carbon; copper; stainless steel surface-treated with carbon, nickel, titanium or silver; an aluminum-cadmium alloy; a non-conductive polymer surface-treated with a conductive material; a conductive polymer; a paste including powder of Ni, Al, Au, Ag, Pd—Ag, Cr, Ta, Cu, Ba or ITO; or a carbon paste including carbon powder of graphite, carbon black or carbon nanotubes.

A twenty sixth embodiment relates to the cable type secondary battery according to the twenty fifth embodiment, wherein the conductive material is any one selected from the group consisting of polyacetylene, polyaniline, polypyrrole, polythiophene, poly sulfur nitride, indium tin oxide (ITO), silver, palladium and nickel, or mixtures thereof.

A twenty seventh embodiment relates to the cable type secondary battery according to the twenty fifth or twenty sixth embodiment, wherein the conductive polymer is any one selected from the group consisting of polyacetylene, polyaniline, polypyrrole, polythiophene and poly sulfur nitride, or mixtures thereof.

A twenty eighth embodiment relates to the cable type secondary battery according to any one of the first to twenty seventh embodiments, wherein the sheet-type first inner electrode, the sheet-type inner separation layer, the sheet-type second inner electrode, the sheet-type outer separation layer, and the sheet-type outer electrode have a strip structure extending in one direction.

A twenty ninth embodiment relates to the cable type secondary battery according to any one of the first to twenty eighth embodiments, wherein the sheet-type first inner electrode, the sheet-type inner separation layer, the sheet-type second inner electrode, the sheet-type outer separation layer, and the sheet-type outer electrode are formed such that they are spirally wound in non-overlapping turns.

A thirtieth embodiment relates to the cable type secondary battery according to the twenty ninth embodiment, wherein the sheet-type first inner electrode, the sheet-type inner separation layer, the sheet-type second inner electrode, the sheet-type outer separation layer, and the sheet-type outer electrode are formed such that they are spirally wound in non-overlapping turns, each turn spaced apart with a gap that is twice or less as large as a width of each of the sheet-type first inner electrode, the sheet-type inner separation layer, the sheet-type second inner electrode, the sheet-type outer separation layer, and the sheet-type outer electrode.

A thirty first embodiment relates to the cable type secondary battery according to any one of the first to thirtieth embodiments, wherein the sheet-type first inner electrode, the sheet-type inner separation layer, the sheet-type second inner electrode, the sheet-type outer separation layer, and the sheet-type outer electrode are formed such that they are spirally wound in overlapping turns.

A thirty second embodiment relates to the cable type secondary battery according to the thirty first embodiment, wherein the sheet-type first inner electrode, the sheet-type inner separation layer, the sheet-type second inner electrode, the sheet-type outer separation layer, and the sheet-type outer electrode are formed such that they are spirally wound with a width of an overlapping part 0.9 times or less as large as a width of each of the sheet-type first inner electrode, the sheet-type inner separation layer, the sheet-type second inner electrode, the sheet-type outer separation layer, and the sheet-type outer electrode.

A thirty third embodiment relates to the cable type secondary battery according to any one of the first to thirty second embodiments, wherein the inner electrode support comprises an inner electrode support comprising at least two wires cross-wound spirally.

A thirty fourth embodiment relates to the cable type secondary battery according to any one of the second to thirty third embodiments, wherein an inner electrode current collector core, a lithium ion supplying core comprising an electrolyte, or a filling core is formed in the space formed within the inner electrode support.

A thirty fifth embodiment relates to the cable type secondary battery according to the thirty fourth embodiment, wherein the inner electrode current collector core is made of carbon nanotubes, stainless steel, aluminum, nickel, titanium, fired carbon or copper; stainless steel surface-treated with carbon, nickel, titanium or silver; an aluminum-cadmium alloy; a non-conductive polymer surface-treated with a conductive material; or a conductive polymer.

A thirty sixth embodiment relates to the cable type secondary battery according to the thirty fourth or thirty fifth embodiment, wherein the lithium ion supplying core comprises a gel-type polymer electrolyte and a support.

A thirty seventh embodiment relates to the cable type secondary battery according to any one of the thirty fourth to thirty sixth embodiments, wherein the lithium ion supplying core comprises a liquid electrolyte and a porous carrier.

A thirty eighth embodiment relates to the cable type secondary battery according to any one of the thirty fourth to thirty seventh embodiments, wherein the electrolyte includes an electrolyte selected from a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methylacetate (MA), or methylpropionate (MP); a gel-type polymer electrolyte using PEO, PVdF, PVdF-HFP, PMMA, PAN or PVAc; or a solid electrolyte using PEO, polypropylene oxide (PPO), polyethylene imine (PEI), polyethylene sulphide (PES) or polyvinyl acetate (PVAc).

A thirty ninth embodiment relates to the cable type secondary battery according to any one of the thirty fourth to thirty eighth embodiments, wherein the electrolyte further comprises a lithium salt.

A fortieth embodiment relates to the cable type secondary battery according to the thirty ninth embodiment, wherein the lithium salt is any one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate and lithium tetraphenylborate, or mixtures thereof.

A forty first embodiment relates to the cable type secondary battery according to any one of the thirty fourth to fortieth embodiments, wherein the filling core comprises a polymer resin, rubber, or an inorganic material, and the polymer resin, the rubber, or the inorganic material have a shape of a wire, a fiber, powder, a mesh, or a foam.

A forty second embodiment relates to the cable type secondary battery according to any one of the first to forty first embodiments, wherein the first inner electrode and the outer electrode are a positive electrode and the second inner electrode is a negative electrode, or the first inner electrode and the outer electrode are a negative electrode and the second inner electrode is a positive electrode.

A forty third embodiment relates to the cable type secondary battery according to any one of the fifth to forty second embodiments, wherein in case that the first inner electrode and the outer electrode are a negative electrode, each of the first inner electrode active material and the outer electrode active material comprises, independently, active material particles of any one selected from the group consisting of natural graphite, artificial graphite or a carbonaceous material; lithium-containing titanium composite oxide (LTO), metals (Me) including Si, Sn, Li, Zn, Mg, Cd, Ce, Ni or Fe; alloys consisting of the metals (Me); oxides (MeOx) of the metals (Me); and composites of the metals (Me) and carbon, or mixtures thereof, and in case that the first inner electrode and the outer electrode are a positive electrode, each of the first inner electrode active material and the outer electrode active material comprises, independently, active material particles of any one selected from the group consisting of $LiCoO_2$, $LiNiO_2$, $LiMn_2O_4$, $LiCoPO_4$, $LiFePO_4$, and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg and Mo, and x, y and z are each independently atomic fractions of elements in an oxide composition, in which $0 \leq x < 0.5$, $0 \leq y < 0.5$, $0 \leq z < 0.5$, $0 < x+y+z \leq 1$), or mixtures thereof.

A forty fourth embodiment relates to the cable type secondary battery according to any one of the ninth to forty third embodiments, wherein in case that the second inner electrode is a positive electrode, the second inner electrode active material comprises active material particles of any one selected from the group consisting of $LiCoO_2$, $LiNiO_2$, $LiMn_2O_4$, $LiCoPO_4$, $LiFePO_4$, and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg and Mo, and x, y and z are each independently atomic fractions of elements in an oxide composition, in which $0 \leq x < 0.5$, $0 \leq y < 0.5$, $0 \leq z < 0.5$, $0 < x+y+z \leq 1$), or mixtures thereof, and in case that the second inner electrode is a negative electrode, the second inner electrode active material comprises active material particles of any one selected from the group consisting of natural graphite, artificial graphite or a carbonaceous material; lithium-containing titanium composite oxide (LTO), metals (Me) including Si, Sn, Li, Zn, Mg, Cd, Ce, Ni or Fe; alloys consisting of the metals (Me); oxides (MeOx) of the metals (Me); and composites of the metals (Me) and carbon, or mixtures thereof.

A forty fifth embodiment relates to the cable type secondary battery according to any one of the first to forty fourth embodiments, wherein each of the inner separation layer and the outer separation layer is an electrolyte layer or a separator.

A forty sixth embodiment relates to the cable type secondary battery according to the forty fifth embodiment, wherein the electrolyte layer comprises an electrolyte selected from a gel-type polymer electrolyte using PEO, PVdF, PVdF-HFP, PMMA, PAN or PVAc; or a solid electrolyte using PEO, polypropylene oxide (PPO), polyethylene imine (PEI), polyethylene sulphide (PES) or polyvinyl acetate (PVAc).

A forty seventh embodiment relates to the cable type secondary battery according to the forty fifth or forty sixth embodiment, wherein the electrolyte layer further comprises a lithium salt.

A forty eighth embodiment relates to the cable type secondary battery according to the forty seventh embodiment, wherein the lithium salt is any one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate and lithium tetraphenylborate, or mixtures thereof.

A forty ninth embodiment relates to the cable type secondary battery according to any one of the forty fifth to forty eighth embodiments, wherein the separator is a separator comprising a porous polymer substrate made of a polyolefin-based polymer selected from the group consisting of ethylene homopolymer, propylene homopolymer, ethylene-butene copolymer, ethylene-hexene copolymer and ethylene-methacrylate copolymer; a porous polymer substrate made of a polymer selected from the group consisting of polyester, polyacetal, polyamide, polycarbonate, polyimide, polyether ether ketone, polyether sulfone, polyphenylene oxide, polyphenylene sulfide and polyethylene naphthalate; a porous substrate formed of a mixture of inorganic particles and a binder polymer; or a porous coating layer formed of a mixture of inorganic particles and a binder polymer on at least one surface of the porous polymer substrate.

A fiftieth embodiment relates to the cable type secondary battery according to the forty ninth embodiment, wherein the porous polymer substrate is a porous polymer film substrate or a porous non-woven fabric substrate.

A fifty first embodiment relates to the cable type secondary battery according to any one of the first to fiftieth embodiments, further including a protective coating formed around an exterior of the cable type secondary battery.

A fifty second embodiment relates to the cable type secondary battery according to the fifth first embodiment, wherein the protective coating is formed of a polymer resin.

A fifty third embodiment relates to the cable type secondary battery according to the fifth second embodiment, wherein the polymer resin includes any one selected from the group consisting of PET, PVC, HDPE and an epoxy resin, or mixtures thereof.

A fifty fourth embodiment relates to the cable type secondary battery according to any one of the fifty first to fifty third embodiments, wherein the protective coating further comprises a moisture barrier layer.

A fifty fifth embodiment relates to the cable type secondary battery according to the fifty fourth embodiment, wherein the moisture barrier layer is formed of aluminum or a liquid crystal polymer.

A fifty sixth embodiment relates to the cable type secondary battery according to any one of the first to fifty fifth embodiments, wherein each of a sheet-type electrode and a sheet-type separation layer is formed by further winding one or more turns in a sequential order between the outer separation layer and the outer electrode.

A fifty seventh embodiment relates to a cable type secondary battery including a lithium ion supplying core comprising an electrolyte, an inner electrode support with open structure formed around the lithium ion supplying core, an inner electrode comprising a sheet-type first inner electrode formed such that it is spirally wound on an exterior of the inner electrode support, a sheet-type inner separation layer formed such that it is spirally wound on an exterior of the first inner electrode, and a sheet-type second inner electrode formed such that it is spirally wound on an exterior of the inner separation layer, an outer separation layer formed such that it is spirally wound on an exterior of the inner electrode, and an outer electrode formed such that it is spirally wound on an exterior of the outer separation layer.

A fifty eighth embodiment relates to a cable type secondary battery including at least two inner electrode supports arranged in parallel, at least two inner electrodes, each comprising a sheet-type first inner electrode formed such that it is spirally wound on an exterior of each of the at least two inner electrode supports, a sheet-type inner separation layer formed such that it is spirally wound on an exterior of the first inner electrode, and a sheet-type second inner electrode formed such that it is spirally wound on an exterior of the inner separation layer, an outer separation layer formed such that it is spirally wound around an exterior of the at least two inner electrodes together, and an outer electrode formed such that it is spirally wound on an exterior of the outer separation layer.

A fifty ninth embodiment relates to a cable type secondary battery including at least two lithium ion supplying cores comprising an electrolyte, at least two inner electrodes, each comprising a sheet-type first inner electrode formed such that it is spirally wound on an exterior of each of the at least two inner electrode supports, a sheet-type inner separation layer formed such that it is spirally wound on an exterior of the first inner electrode, and a sheet-type second inner electrode formed such that it is spirally wound on an exterior of the inner separation layer, an outer separation layer formed such that it is spirally wound around an exterior of the at least two inner electrodes together, and an outer electrode formed such that it is spirally wound on an exterior of the outer separation layer.

Advantageous Effects

According to an embodiment of the present disclosure, a wire-type current collector with high resistance is excluded and a sheet-type electrode is included, thereby reducing resistance of a cable type secondary battery, contributing to improvements in battery performance.

Additionally, according to an embodiment of the present disclosure, an inner electrode has a multilayer electrode structure, including a first inner electrode and a second inner electrode, thereby realizing a high-capacity cable type secondary battery.

Furthermore, according to an embodiment of the present disclosure, a lithium ion supplying core including an electrolyte is disposed within an inner electrode support, and the inner electrode support has an open structure, allowing the electrolyte of the lithium ion supplying core to easily permeate into an electrode active material, leading to easy supply and exchange of lithium ions. Thereby the capacity and cycle characteristics of the battery are superior.

Moreover, a cable type secondary battery according to an embodiment of the present disclosure has an inner electrode support with an open structure, and a sheet-type electrode and a sheet-type separation layer spirally wound like a spring structure, thereby maintaining a linear shape, and mitigating stress caused by an external force.

BRIEF DESCRIPTION OF THE DRAWINGS

The accompanying drawings illustrate preferred embodiments of the present disclosure, and together with the foregoing disclosure, serve to provide further understanding of the technical spirit of the present disclosure. However, the present disclosure is not to be construed as being limited to the drawings.

MODE FOR CARRYING OUT THE INVENTION

Figure 1:
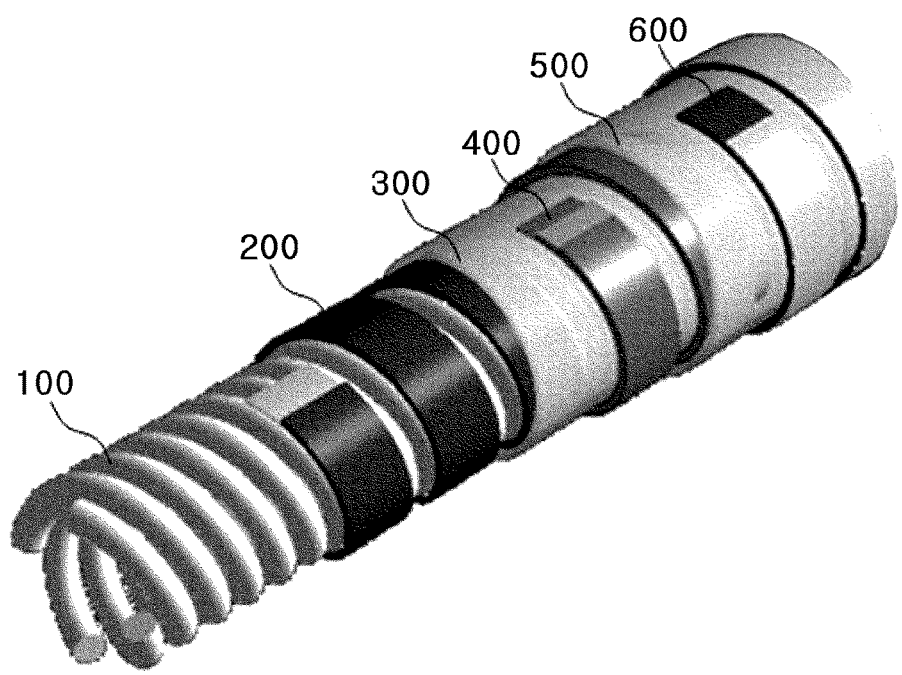
FIG. 1 is a diagram showing the structure of a cable type secondary battery according to an embodiment of the present disclosure.

Hereinafter, the present disclosure will be described in detail with reference to the accompanying drawings. It should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the disclosure described herein are just one most preferred embodiment of the present disclosure, not intended to represent all the technical aspects of the present disclosure, so it should be understood that various equivalents and variations as alternatives thereto would be made at the time the present application is filed.

That is, a cable type secondary battery according to an embodiment of the present disclosure includes an inner electrode support; an inner electrode including a sheet-type first inner electrode formed such that it is spirally wound on the exterior of the inner electrode support, a sheet-type inner separation layer formed such that it is spirally wound on the exterior of the first inner electrode, and a sheet-type second inner electrode formed such that it is spirally wound on the exterior of the inner separation layer; an outer separation layer formed such that it is spirally wound on the exterior of the inner electrode; and an outer electrode formed such that it is spirally wound on the exterior of the outer separation layer.

In case that a wire-type current collector is used, generally because line resistance is higher than sheet resistance, resistance applied to the wire-type current collector affects the battery, causing the battery performance to degrade. However, according to the present disclosure, because the first inner electrode, the second inner electrode, and the outer electrode is a sheet-type electrode using a sheet-type current collector as a current collector, the battery resistance can be reduced, and through this, the battery performance can be improved.

Here, the term spiral, also known as a helix, refers to a curve that turns in a twisting shape within a predetermined range, and collectively represents shapes similar to the shape of a general spring.

In this instance, the sheet-type first inner electrode, the sheet-type second inner electrode, and the sheet-type outer electrode may have a strip structure extending in one direction.

Also, the sheet-type first inner electrode, the sheet-type second inner electrode, and the sheet-type outer electrode may be spirally wound in non-overlapping turns. In this instance, each of the sheet-type first inner electrode, the sheet-type second inner electrode, and the sheet-type outer electrode may be spirally wound in non-overlapping turns, each turn spaced apart with a gap that is twice or less as large as the width of the sheet-type separation layer-electrode complex, to prevent any battery performance degradation.

Also, the sheet-type first inner electrode, the sheet-type second inner electrode, and the sheet-type outer electrode may be spirally wound in overlapping turns. In this instance, to prevent an excessive increase in the internal resistance of the battery, each of the sheet-type first inner electrode, the sheet-type second inner electrode, and the sheet-type outer electrode may be spirally wound such that the width of an overlapping part is 0.9 times or less as large as the width of each of the sheet-type first inner electrode, the sheet-type second inner electrode, and the sheet-type outer electrode.

Referring to FIG. 1, the cable type secondary battery according to an embodiment of the present disclosure includes an inner electrode support 100; an inner electrode including a sheet-type first inner electrode 200 formed such that it is spirally wound on the exterior of the inner electrode support 100, a sheet-type inner separation layer 300 formed such that it is spirally wound on the exterior of the first inner electrode 200, and a sheet-type second inner electrode 400 formed such that it is spirally wound on the exterior of the inner separation layer 300; an outer separation layer 500 formed such that it is spirally wound on the exterior of the inner electrode; and an outer electrode 600 formed such that it is spirally wound on the exterior of the outer separation layer 500.

The inner electrode support may have an open structure in which a space is formed inside, namely, an electrolyte diffusion channel is formed on the surface facing the first inner electrode. The open structure used herein refers to a structure in a shape that allows free movement of a material from the inside to the outside through a boundary surface, the open structure being defined as the boundary surface. As a result, an electrolyte may be easily introduced in both the direction toward the first inner electrode from the inside of the inner electrode support and the direction toward the inside of the inner electrode support from the first inner electrode.

The inner electrode support with open structure may be at least one spirally wound wire, at least one spirally wound sheet, a hollow fiber, or a mesh-type support, and may have pores on the surface to allow free movement of an electrolyte to an inner electrode active material and an outer electrode active material, leading to good wetting.

The inner electrode support with open structure can maintain the linear shape of the cable type secondary battery, prevent structure deformation of the battery caused by an external force, and prevent structure destruction or deformation of the electrode, thereby ensuring flexibility of the cable type secondary battery.

Here, the hollow fiber may be obtained by a common method for forming a hollow fiber, using at least one polymer selected from the group consisting of polyethylene, polypropylene, polytetrafluoroethylene, polyvinylidenefluoride, polyacrylonitrile, polyimide, polyethyleneterephthalate, polyamide imide, polyester imide, polyether sulfone, and polysulfone.

Also, when wound, the wire-type support may have the same shape as a spring structure formed of a polymer or a metal. In this instance, the polymer may include materials with good chemical resistance and no reactivity with an electrolyte solution, and for example, the polymer may be the same as the examples of hollow fibers as described above, or examples of polymers for a binder as described below. Also, for the metal, the same thing as metals for an inner current collector or an outer current collector as described below may be used.

In this instance, the diameter of the inner electrode support may be from 0.1 to 10 mm, and may have pores having a diameter of from 100 nm to 10 µm on the surface.

Also, the inner electrode support according to an embodiment of the present disclosure may have a structure with no internal space, and for example, may be a linear wire or a twisted wire. The linear wire or twisted wire may be formed of the above-described polymer or metal. In this instance, the linear wire used herein refers to a wire shape extending linearly in the lengthwise direction, and the twisted wire used herein refers to a wire shape where the linear wire is twined and twisted itself without forming an internal space.

Figure 2:
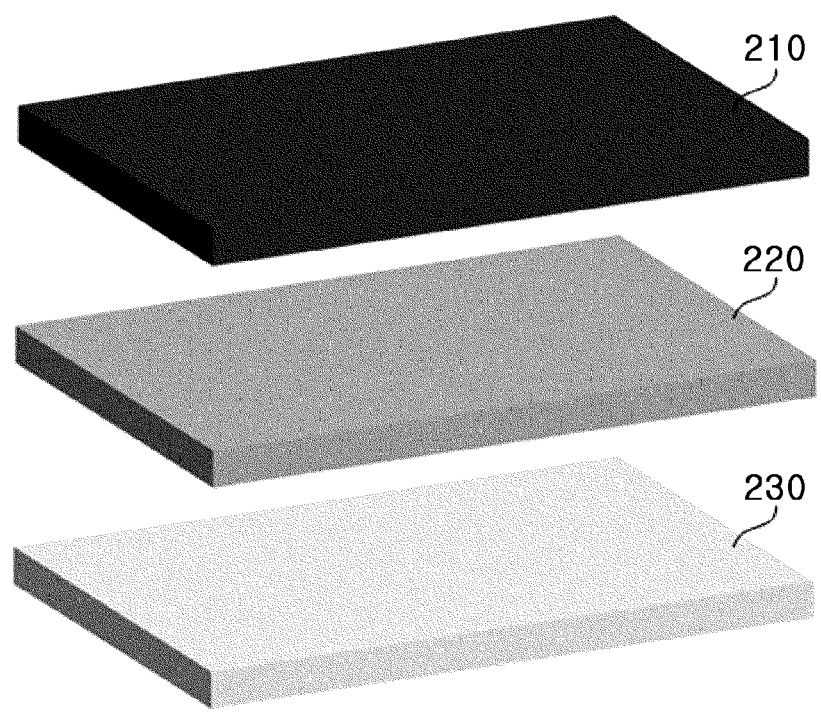
FIG. 2 is a diagram showing the structure of a sheet-type first inner electrode according to an embodiment of the present disclosure.
Figure 3:
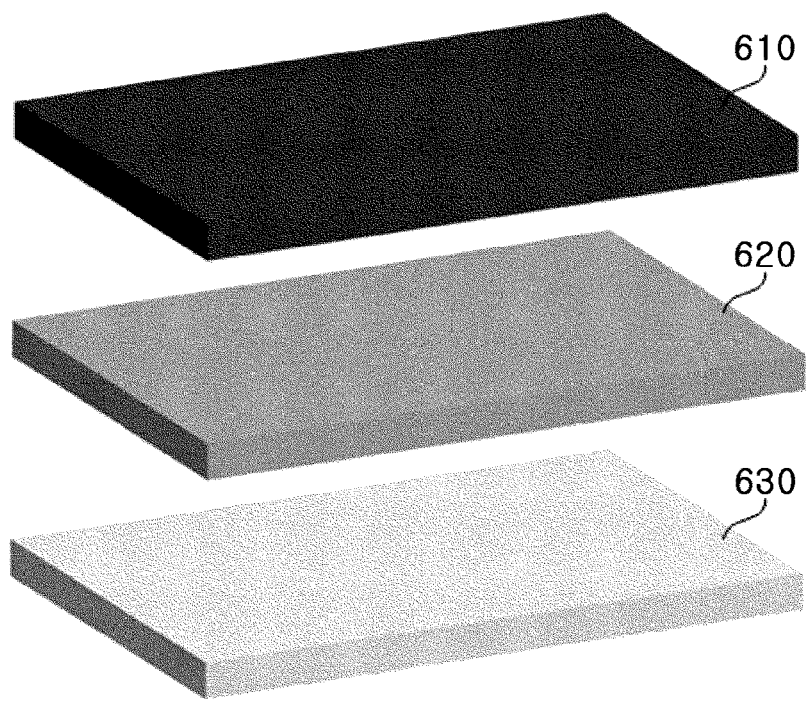
FIG. 3 is a diagram showing the structure of a sheet-type outer electrode according to an embodiment of the present disclosure.

On the other hand, FIG. 2 shows the structure of the sheet-type first inner electrode according to an embodiment of the present disclosure, and FIG. 3 shows the structure of the sheet-type outer electrode according to an embodiment of the present disclosure.

The first inner electrode includes a first inner current collector 220 and a first inner electrode active material layer 210 formed on one surface of the first inner current collector 220, and the outer electrode includes an outer current collector 620 and an outer electrode active material layer 610 formed on one surface of the outer current collector 620.

In this instance, a polymer film layer 230 formed on the other surface of the first inner current collector may be further included, and a polymer film layer 630 formed on the other surface of the outer current collector may be further included. The polymer film layer can act to support the first inner current collector and the outer current collector, so the first inner current collector and the outer current collector can be formed as a thin film having a smaller thickness. Thus, for example, the first inner current collector and the outer current collector may be formed on the polymer film layer by a process such as vapor deposition.

Here, the polymer film layer may be formed of any one selected from the group consisting of polyolefin, polyester, polyimide and polyamide, or mixtures thereof.

Also, the first inner current collector or the outer current collector may be a film-type current collector or a mesh-type current collector.

According to an embodiment of the present disclosure, in case that the electrode current collector is of wound sheet type or wound mesh type, it is possible to solve the problem with a high resistance element due to a small surface area and reductions in rate characteristics of the battery due to the battery resistance during high rate charging/discharging when the electrode current collector is of wire type.

Figure 4:
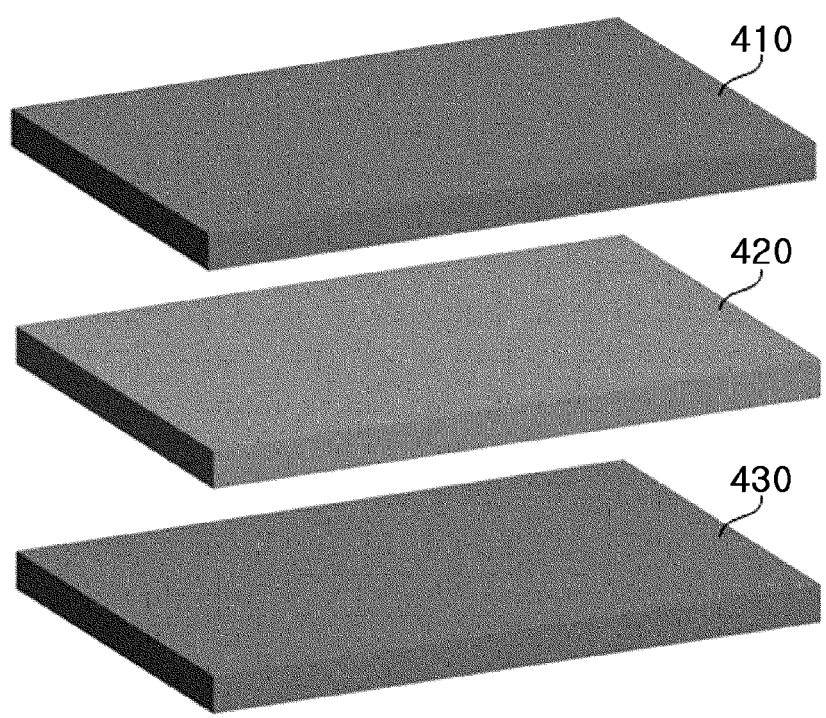
FIGS. 4 and 5 are diagrams showing the structure of a second inner electrode according to an embodiment of the present disclosure.
Figure 5:
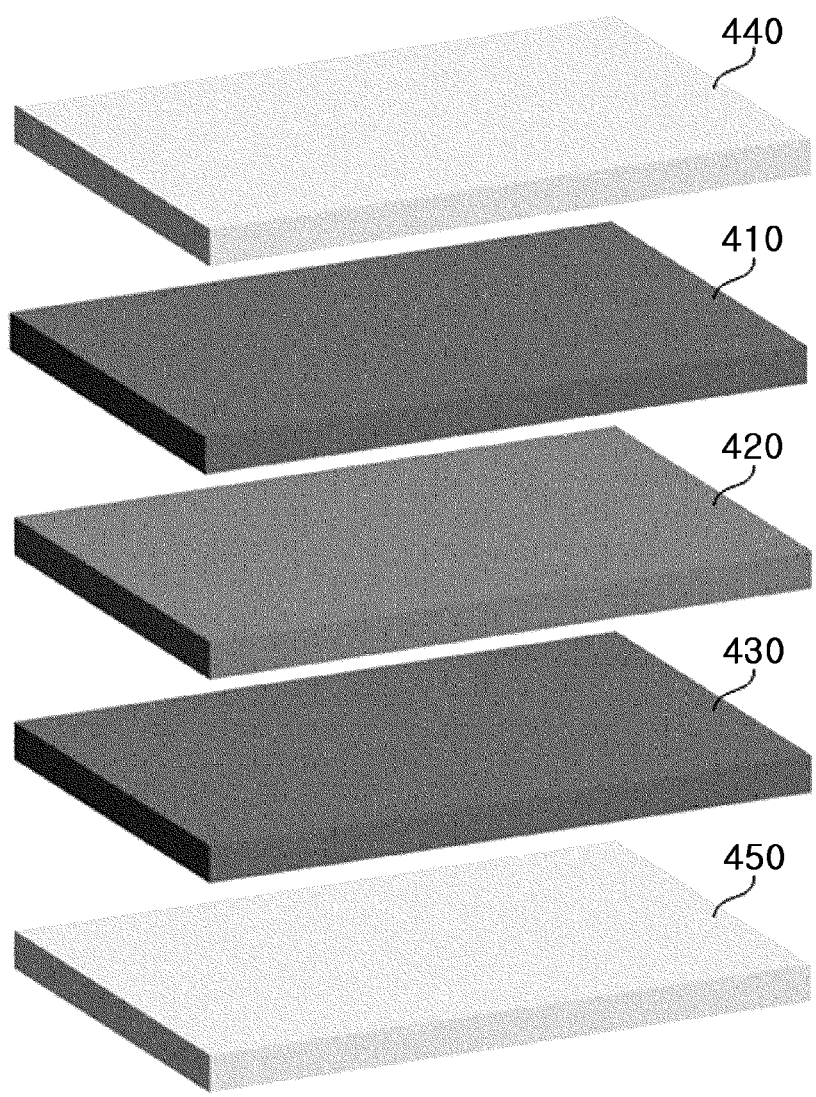

FIGS. 4 and 5 show the structure of the second inner electrode according to an embodiment of the present disclosure.

Referring to FIG. 4, the second inner electrode may include a second inner current collector 420 and second inner electrode active material layers 410, 430 formed on both surfaces of the second inner current collector 420. In this instance, the second inner current collector may be a film-type current collector or a mesh-type current collector.

On the other hand, the first inner electrode, the second inner electrode, and the outer electrode may further include a polymer support layer formed on the surface of each active material layer.

According to an embodiment of the present disclosure, when the polymer support layer is further included on the surface of each active material layer, even if bending occurs in the cable type secondary battery due to an external force, cracking occurring on the surface of the active material layer is remarkably prevented. Thereby, delamination of the active material layer is further prevented, and battery performance is further improved. Further, the polymer support layer may have a porous structure, and in this instance, it enhances the permeation of an electrolyte solution into the active material layer, thereby preventing increases in electrode resistance.

Here, the polymer support layer may include a polar linear polymer, an oxide-based linear polymer, or mixtures thereof.

In this instance, the polar linear polymer may be any one selected from the group consisting of polyacrylonitrile, polyvinyl chloride, polyvinylidene fluoride (PVDF), polyvinylidene fluoride-co-hexafluoro propylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate and poly-p-phenylene terephthalamide, or mixtures thereof.

Also, the oxide-based linear polymer may be any one selected from the group consisting of polyethylene oxide, polypropylene oxide, polyoxymethylene and polydimethylsiloxane, or mixtures thereof.

Also, the polymer support layer may be a porous polymer layer having a pore size of from 0.01 µm to 10 µm and porosity of from 5% to 95%.

Also, the porous structure of the porous polymer layer may be formed through a phase separation or a phase shift by a non-solvent in the manufacturing process.

For example, a polymer, polyvinylidene fluoride-co-hexafluoropropylene, is added to acetone acting as a solvent, to prepare a solution with 10 wt % solids content. Subsequently, 2 to 10 wt % of water or ethanol as a non-solvent is added to the prepared solution to prepare a polymer solution.

During evaporation of the polymer solution after being coated, a phase shift takes place, and in the phase separated regions of the non-solvent and the polymer, areas occupied by the non-solvent become pores. Accordingly, the pore size may be adjusted by the extent to which the polymer is dissolved in the non-solvent and the content of the non-solvent.

According to FIG. 5, the second inner electrode may include a second inner current collector 420, second inner electrode active material layers 410, 430 formed on both surfaces of the second inner current collector 420, and polymer support layers 440, 450 each formed on the surfaces of the second inner electrode active material layers.

On the other hand, if an external force such as bending or twisting is applied to the cable type secondary battery, the electrode active material layer may be delaminated from the electrode current collector. Thus, for the flexibility of the electrode, a large amount of binder components are included in the electrode active material layer. However, such a large amount of binders are prone to desorb from the electrode current collector due to swelling occurred by an electrolyte solution, causing the battery performance to degrade.

Accordingly, to improve adhesion between the electrode active material layer and the electrode current collector, at least one of the first inner current collector and the outer current collector may further include a primer coating layer formed of a conductive material and a binder. As described below, the second inner current collector may further include a primer coating layer formed of a conductive material and a binder for the same reason.

In this instance, the conductive material may include any one selected from the group consisting of carbon black, acetylene black, ketjen black, carbon fibers, carbon nanotubes and graphene, or mixtures thereof.

Also, the binder may be any one selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer and polyimide, or mixtures thereof.

Also, to increase the surface area of the inner current collector and the outer current collector, a plurality of recesses may be formed on at least one surface. In this instance, the plurality of recesses may have continuous patterns or intermittent patterns. That is, continuous patterns of recesses arranged in the lengthwise direction, spaced apart from each other, may be formed, or intermittent patterns of multiple holes may be formed. The multiple holes may be circular or polygonal in shape.

On the other hand, the inner electrode current collector is preferably manufactured using stainless steel, aluminum, nickel, titanium, fired carbon or copper; or stainless steel surface-treated with carbon, nickel, titanium or silver; an aluminum-cadmium alloy; a non-conductive polymer surface-treated with a conductive material; or a conductive polymer.

A current collector plays a role in collecting electrons generated by electrochemical reactions of an active material or supplying electrons required for electrochemical reactions, and generally uses a metal such as copper or aluminum. Particularly, in case that a polymer conductor made of a non-conductive polymer surface-treated with a conductive material or a conductive polymer is used, flexibility is better than the case using a metal such as copper or aluminum. Also, in place of a metal current collector, the use of a polymer current collector can achieve light weight of the battery.

The conductive material includes polyacetylene, polyaniline, polypyrrole, polythiophene, poly sulfur nitride, indium tin oxide (ITO), silver, palladium, and nickel, and the conductive polymer includes polyacetylene, polyaniline, polypyrrole, polythiophene, and poly sulfur nitride. The non-conductive polymer used for the current collector is not limited to a particular type.

The outer current collector of the present disclosure may include those made of stainless steel, aluminum, nickel, titanium, fired carbon or copper; stainless steel surface-treated with carbon, nickel, titanium or silver; an aluminum-cadmium alloy; a non-conductive polymer surface-treated with a conductive material; a conductive polymer; a paste including powder of Ni, Al, Au, Ag, Al, Pd—Ag, Cr, Ta, Cu, Ba or ITO; or a carbon paste including carbon powder of graphite, carbon black or carbon nanotubes. In this instance, the conductive material and the conductive polymer may be the same as those used for the inner current collector as described above.

On the other hand, the inner electrode support may have a hollow structure in which a space is formed inside.

In this instance, the inner electrode support may include an inner electrode support consisting of at least one wire wound spirally, or an inner electrode support consisting of at least one sheet wound spirally.

Also, the inner electrode support may include an inner electrode support consisting of at least two wires cross-wound spirally.

Also, in the space formed within the inner electrode support, an inner electrode current collector core may be formed.

In this instance, the inner electrode current collector core may be made of carbon nanotubes, stainless steel, aluminum, nickel, titanium, fired carbon or copper; stainless steel surface-treated with carbon, nickel, titanium or silver; an aluminum-cadmium alloy; a non-conductive polymer surface-treated with a conductive material; or a conductive polymer.

Also, in the space formed within the inner electrode support, a lithium ion supplying core including an electrolyte may be formed.

A conventional cable type secondary battery has an electrolyte layer between an inner electrode and an outer electrode, and because it must isolate an inner electrode from an outer electrode to prevent a short circuit, the electrolyte layer needs to use a gel-type polymer electrolyte or a solid polymer electrolyte having a of predetermined level mechanical properties. However, because the gel-type polymer electrolyte or solid polymer electrolyte does not have good performance as a lithium ion source, to supply a sufficient quantity of lithium ions to the electrode active material layer, there is no choice but to increase the thickness of the electrolyte layer, and with increasing thickness of the electrolyte layer, a gap between electrodes becomes larger and the resistance increases, causing battery performance to degrade.

To solve the problem, according to an embodiment of the present disclosure, a lithium ion supplying core including an electrolyte is provided in the inner electrode support with open structure, to allow the electrolyte in the lithium ion supplying core to reach the inner electrode active material layer and the outer electrode active material layer through the inner electrode support.

In this instance, the lithium ion supplying core may include a gel-type polymer electrolyte and a support.

Also, the lithium ion supplying core may include a liquid electrolyte and a porous carrier.

Also, in the space formed within the inner electrode support, a filling core may be formed.

In addition to materials for forming the inner electrode current collector core and the lithium ion supplying core as described above, the filling core may be formed of materials for improving various performances of the cable type secondary battery, for example, polymer resins, rubbers, and inorganic materials, and the polymer resins, rubbers, and inorganic materials have various shapes such as a wire, a fiber, powder, a mesh, and a foam.

The cable type secondary battery according to an embodiment of the present disclosure may have a horizontal cross section in a predetermined shape, and have a linear structure elongating in the lengthwise direction with regard to the horizontal cross section. The cable type secondary battery according to an embodiment of the present disclosure may have flexibility and thus free shape adaptability. Here, the predetermined shape is not limited to a particular shape, and any shape that does not detract from the nature of the present disclosure can be contemplated.

On the other hand, the lithium ion supplying core includes an electrolyte, and the electrolyte is not limited to a particular type and may include a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methylacetate (MA), or methylpropionate (MP); a gel-type polymer electrolyte using PEO, PVdF, PVdF-HFP, PMMA, PAN or PVAc; or a solid electrolyte using PEO, polypropylene oxide (PPO), polyethylene imine (PEI), polyethylene sulphide (PES) or polyvinyl acetate (PVAc). The electrolyte may further include a lithium salt, and the lithium salt preferably includes LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate and lithium tetraphenylborate. Also, the lithium ion supplying core 110, 210, 310 may consist only of an electrolyte, and in the case of a liquid electrolyte solution, may be formed using a porous carrier.

The first inner electrode and the outer electrode may be a positive electrode and the second inner electrode may be a negative electrode, or the first inner electrode and the outer electrode may be a negative electrode and the second inner electrode may be a positive electrode.

The electrode active material layer of the present disclosure acts to move ions through the current collector, and the movements of ions are made by interaction through intercalation of ions from the electrolyte layer and deintercalation of ions to the electrolyte layer.

The electrode active material layer can be classified into a negative electrode active material layer and a positive electrode active material layer.

Specifically, in case that the first inner electrode and the outer electrode are a negative electrode, the first inner electrode active material and the outer electrode active material may each independently include active material particles of any one selected from the group consisting of natural graphite, artificial graphite or a carbonaceous material; lithium-containing titanium composite oxide (LTO), and metals (Me) including Si, Sn, Li, Zn, Mg, Cd, Ce, Ni or Fe; alloys consisting of the metals (Me); oxides (MeOx) of the metals (Me); and composites of the metals (Me) and carbon, or mixtures thereof, and in case that the first inner electrode and the outer electrode are a negative electrode, the first inner electrode active material and the outer electrode active material may each independently include active material particles of any one selected from the group consisting of LiCoO$_2$, LiNiO$_2$, LiMn$_2$O$_4$, LiCoPO$_4$, LiFePO$_4$, and LiNi$_{1-x-y-z}$Co$_x$M1$_y$M2$_z$O$_2$ (M1 and M2 are each independently any one selected from the group consisting of Al, Ni, Co, Fe, Mn, V, Cr, Ti, W, Ta, Mg and Mo, and x, y and z are each independently atomic fractions of elements in an oxide composition, in which 0≤x<0.5, 0≤y<0.5, 0≤z<0.5, 0<x+y+z≤1), or mixtures thereof.

Also, in case that the first inner electrode and the outer electrode are a positive electrode and the second inner electrode is a negative electrode, the first inner electrode active material layer and the outer electrode active material layer may be a positive electrode active material layer, and the second inner electrode active material layer may be a negative electrode active material layer.

The electrode active material layer includes an electrode active material, a binder and a conductive material, and is bonded to the current collector to form an electrode. When the electrode is deformed, for example, bent or severely folded, by external force, the electrode active material may be released. The release of the electrode active material results in reductions in performance and capacity of the battery. However, because the current collector has elasticity, it functions to disperse the applied force when such a deformation occurs by the external force, so the active material layer is less deformed, thus preventing the active material from being released.

For the inner separation layer and the outer separation layer of the present disclosure, an electrolyte layer or a separator may be used.

The electrolyte layer which acts as an ion channel may include a gel-type polymer electrolyte using PEO, PVdF, PVdF-HFP, PMMA, PAN or PVAc; or a solid electrolyte using PEO, polypropylene oxide (PPO), polyethylene imine (PEI), polyethylene sulphide (PES) or polyvinyl acetate (PVAc). The matrix of the solid electrolyte preferably comprises a polymer or a ceramic glass as the backbone. In the case of typical polymer electrolytes, ions move very slowly in terms of a reaction rate, even when the ionic conductivity is satisfied. Thus, using the gel-type polymer electrolyte which facilitates the movement of ions is preferable to using the solid electrolyte. The gel-type polymer electrolyte has poor mechanical properties and thus may include a support to improve the poor mechanical properties, and for the support, a support with a porous structure or a cross-linked polymer may be used. The electrolyte layer of the present disclosure can serve as a separator, and thus the use of a separate separator may be eliminated.

According to an embodiment of the present disclosure, the electrolyte layer may further include a lithium salt. The lithium salt can improve the ionic conductivity and reaction rate, and its non-limiting example includes LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate and lithium tetraphenylborate.

The separator is not limited to a particular type, but may include a porous polymer substrate made of a polyolefin-based polymer selected from the group consisting of ethylene homopolymer, propylene homopolymer, ethylene-butene copolymer, ethylene-hexene copolymer, and ethylene-methacrylate copolymer; a porous polymer substrate made of a polymer selected from the group consisting of polyester, polyacetal, polyamide, polycarbonate, polyimide, polyether ether ketone, polyether sulfone, polyphenylene oxide, polyphenylene sulfide and polyethylene naphthalate; a porous substrate made of a mixture of inorganic particles and a binder polymer; or a separator with a porous coating layer formed of a mixture of inorganic particles and a binder polymer on at least one surface of the porous polymer substrate.

In this instance, the porous coating layer formed of a mixture of inorganic particles and a binder polymer has the inorganic particles packed in contact with each other and bound to each other by the binder polymer, and thereby interstitial volumes are created between the inorganic particles, and the interstitial volumes between the inorganic particles become empty spaces to form pores.

That is, the binder polymer adheres the inorganic particles to each other, for example, the binder polymer connects and immobilizes the inorganic particles, to maintain a bound state of the inorganic particles. Also, the pores of the porous coating layer are pores that are empty spaces formed by the interstitial volumes between the inorganic particles, and they are spaces defined by the inorganic particles substantially in contact with each other in a structure in which the inorganic particles are closed packed or densely packed. Through the pores of the porous coating layer, a movement channel for lithium ions that are indispensable to operate the battery can be provided.

Particularly, in order for the lithium ions from the lithium ion supplying core to be easily transferred to the outer electrode, it is preferable to use the separator made of a non-woven fabric corresponding to the porous polymer substrate made of a polymer selected from the group consisting of polyester, polyacetal, polyamide, polycarbonate, polyimide, polyether ether ketone, polyether sulfone, polyphenylene oxide, polyphenylene sulfide and polyethylene naphthalate.

According to an embodiment of the present disclosure, the cable type secondary battery has a protective coating, and the protective coating is formed as an insulator on the exterior of the outer current collector to protect the electrode from moisture in the air and an external impact.

For the protective coating, a general polymer resin including a moisture barrier layer may be used. In this instance, for the moisture barrier layer, aluminum or liquid crystal polymer with outstanding moisture barrier performance may be used, and the polymer resin includes PET, PVC, HDPE or epoxy resin.

Figure 6:
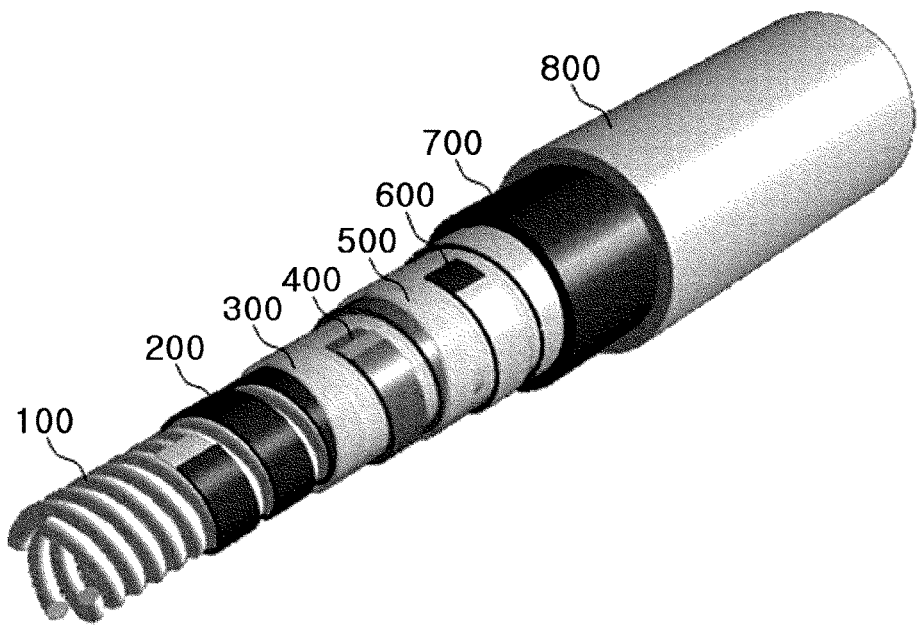
FIG. 6 is a diagram showing the structure of a cable type secondary battery according to an embodiment of the present disclosure.

Referring to FIG. 6, the cable type secondary battery of an embodiment of the present disclosure includes an inner electrode support 100; an inner electrode including a sheet-type first inner electrode 200 formed such that it is spirally wound on the exterior of the inner electrode support 100, a sheet-type inner separation layer 300 such that it is spirally wound on the exterior of the first inner electrode 200, and a sheet-type second inner electrode 400 formed such that it is spirally wound on the exterior of the inner separation layer 300; an outer separation layer 500 formed such that it is spirally wound on the exterior of the inner electrode; an outer electrode 600 formed such that it is spirally wound on the exterior of the outer separation layer 500; an aluminum pouch layer 700 formed on the exterior of the outer electrode, and a polymer protective coating 800 formed on the exterior of the aluminum pouch layer 700.

The pouch layer may include a moisture barrier layer formed of metal such as aluminum, an insulation layer formed of polyester such as PET or polyamide such as nylon on one surface of the moisture barrier layer, and a thermal adhesive layer formed of polypropylene, polycarbonate, and polyethylene on the other surface of the moisture barrier layer. Also, the polymer protective coating may be a packaging by over-molding of a polymer material.

Hereinafter, the cable type secondary battery according to an embodiment of the present disclosure and its manufacturing method is described in brief.

The cable type secondary battery of the present disclosure according to an embodiment includes a lithium ion supplying core including an electrolyte; an inner electrode support with open structure formed around the lithium ion supplying core; an inner electrode including a sheet-type first inner electrode formed such that it is spirally wound on the exterior of the inner electrode support, a sheet-type inner separation layer formed such that it is spirally wound on the exterior of the first inner electrode, and a sheet-type second inner electrode formed such that it is spirally wound on the exterior of the inner separation layer; an outer separation layer formed such that it is spirally wound on the exterior of the inner electrode; and an outer electrode formed such that it is spirally wound on the exterior of the outer separation layer.

First, a polymer electrolyte is formed in a wire shape using an extruder to prepare a lithium ion supplying core. Alternatively, after an inner electrode support having a hollow center is prepared, a lithium ion supplying core may be formed by injecting a non-aqueous electrolyte solution into the center of the inner electrode support, and after a battery assembly with a protective coating is prepared, a lithium ion supplying core may be formed by injecting a non-aqueous electrolyte solution into the center of the inner electrode support of the battery. As an alternative method, after a carrier of a sponge material in a wire shape is prepared, a lithium ion supplying core may be prepared by injecting a non-aqueous electrolyte solution.

Subsequently, a wire-type inner electrode support is prepared and wound on the lithium ion supplying core.

Subsequently, a first inner current collector is formed on a polymer film layer, and a first inner electrode active material layer is formed on the first inner current collector by coating, to form a sheet-type first inner electrode. Also, an outer current collector is formed on a polymer film layer, and an outer electrode active material layer is formed on the outer current collector by coating, to form a sheet-type outer electrode. Methods for forming the first inner current collector and the outer current collector on the polymer film layer may include forming the first inner current collector and the outer current collector using each current collector material by a known coating process (e.g., vapor deposition, etc.).

A second inner electrode has a second inner electrode active material layer formed on each of both surfaces of a second inner current collector.

The coating process for the active material layer may include a general coating process, and specifically, electroplating or anodic oxidation process can be used, but it is preferable to use a process of coating an electrode slurry including an active material using a comma coater or a slot die coater. Also, in the case of the electrode slurry including an active material, dip coating or extrusion coating using an extruder can be employed.

An inner separation layer and an outer separation layer are prepared as a separator comprising a porous substrate.

Subsequently, the first inner electrode, the inner separation layer, the second inner electrode, the outer separation layer, and the outer electrode are wound on the exterior of the inner electrode support in that order to make an electrode assembly, and an aluminum pouch layer is formed around the exterior of the electrode assembly and a polymer protective coating is formed thereon.

The protective coating is formed as an insulator on the outermost to protect the electrode from moisture in the air and an external impact.

Also, according to an embodiment of the present disclosure, a sheet-type separation layer and a sheet-type electrode may be each formed by winding one or more turns in a sequential order between the second inner electrode and the outer separation layer, and there is no particular limitation on the number of sheet-type separation layers and sheet-type electrodes further wound. For example, the number of sheet-type separation layers and sheet-type electrodes formed by further winding may be 1 to 50, 1 to 20, 1 to 10, or 1 to 3.

For example, a cable type secondary battery in case that a sheet-type separation layer and a sheet-type electrode are each formed by winding one more turn in a sequential order in an alternating manner includes an inner electrode support; a sheet-type first inner electrode formed such that it is spirally wound on the exterior of the inner electrode support, a sheet-type first inner separation layer formed such that it is spirally wound on the exterior of the first inner electrode, and a sheet-type second inner electrode formed such that it is spirally wound on the exterior of the first inner separation layer; a second inner separation layer such that it is spirally wound on the exterior of the second inner electrode; a sheet-type third inner electrode formed such that it is spirally wound on the exterior of the second inner separation layer; an outer separation layer formed such that it is spirally wound on the exterior of the third inner electrode; and an outer electrode formed such that it is spirally wound on the exterior of the outer separation layer.

Also, a cable type secondary battery in case that a sheet-type electrodes and a sheet-type separation layer are each formed by winding two more turns in a sequential order in an alternating manner includes an inner electrode support; a sheet-type first inner electrode formed such that it is spirally wound on the exterior of the inner electrode support, a sheet-type first inner separation layer formed such that it is spirally wound on the exterior of the first inner electrode, and a sheet-type second inner electrode formed such that it is spirally wound on the exterior of the first inner separation layer; a second inner separation layer formed such that it is spirally wound on the exterior of the second inner electrode; a sheet-type third inner electrode formed such that it is spirally wound on the exterior of the second inner separation layer; a third inner separation layer formed such that it is spirally wound on the exterior of the third inner electrode; a sheet-type fourth inner electrode formed such that it is spirally wound on the exterior of the third inner separation layer; an outer separation layer formed such that it is spirally wound on the exterior of the fourth inner electrode; and an outer electrode formed such that it is spirally wound on the exterior of the outer separation layer.

Hereinafter, another possible embodiment is described.

A cable type secondary battery according to an embodiment of the present disclosure includes at least two inner electrode supports arranged in parallel; at least two inner electrodes, each including a sheet-type first inner electrode formed such that it is spirally wound on the exterior of each of the at least two inner electrode supports, a sheet-type inner separation layer formed such that it is spirally wound on the exterior of the first inner electrode, and a sheet-type second inner electrode formed such that it is spirally wound on the exterior of the inner separation layer; an outer separation layer formed such that it is spirally wound on the exterior of the at least two inner electrodes together; and an outer electrode formed such that it is spirally wound on the exterior of the outer separation layer.

Further, a cable type secondary battery according to another embodiment of the present disclosure includes at least two lithium ion supplying cores including an electrolyte; at least two inner electrodes, each including a sheet-type first inner electrode formed such that it is spirally wound on the exterior of each of the at least two inner electrode supports, a sheet-type inner separation layer formed such that it is spirally wound on the exterior of the first inner electrode, and a sheet-type second inner electrode such that it is spirally wound on the exterior of the inner separation layer; an outer separation layer formed such that it is spirally wound on the exterior of the at least two inner electrodes together; and an outer electrode formed such that it is spirally wound on the exterior of the outer separation layer.

This cable type secondary battery allows easy balance control of the negative electrode and the positive electrode because it has the inner electrode made up of a plurality of electrodes, and can prevent a potential short circuit because it has the plurality of electrodes.

According to an embodiment of the present disclosure, in the case of the cable type secondary battery having the at least two inner electrodes, as described above, additional sheet-type separation layer and additional sheet-type electrode may be each formed by further winding one or more turns in a sequential order between the outermost of each of the at least two inner electrodes and the outer separation layer, and there is no particular limitation on the number of sheet-type separation layers and sheet-type electrodes further wound. For example, the number of sheet-type separation layers and sheet-type electrodes formed by further winding may be 1 to 50, 1 to 20, 1 to 10, or 1 to 3.

DESCRIPTION OF REFERENCE NUMERALS

100: Inner electrode support
200: First inner electrode
300: Inner separation layer
400: Second inner electrode
500: Outer separation layer
600: Outer electrode
700: Aluminum pouch layer
800: Polymer protective coating

What is claimed is:

1. A cable-form secondary battery comprising:
   an inner electrode support;
   an inner electrode comprising a sheet-form first inner electrode formed such that it is helically wound on an exterior of the inner electrode support such that the sheet-form first inner electrode is outside the entire inner electrode support, a sheet-form inner separation layer formed such that it is helically wound on an exterior of the first inner electrode such that the sheet-form inner separation layer is outside the entire sheet-form first inner electrode, and a sheet-form second inner electrode formed such that it is helically wound on an exterior of the inner separation layer such that the sheet-form second inner electrode is outside the entire sheet-form inner separation layer;
   an outer separation layer formed such that it is helically wound on an exterior of the inner electrode such that the outer separation layer is outside the entire inner electrode; and
   an outer electrode formed such that it is helically wound on an exterior of the outer separation layer such that the outer electrode is outside the entire outer separation layer.

2. The cable-form secondary battery according to claim 1, wherein the inner electrode support has an open structure in which a space is formed inside.

3. The cable-form secondary battery according to claim 1, wherein the inner electrode support is at least one helically wound wire, at least one helically wound sheet, a twisted wire, a linear wire, a hollow fiber, or a mesh support.

4. The cable-form secondary battery according to claim 3, wherein the hollow fiber is formed of at least one selected from the group consisting of polyethylene, polypropylene, polytetrafluoroethylene, polyvinylidenefluoride, polyacrylonitrile, polyimide, polyethyleneterephthalate, polyamide imide, polyester imide, polyether sulfone, and polysulfone.

5. The cable-form secondary battery according to claim 1, wherein the first inner electrode comprises a first inner current collector and a first inner electrode active material layer formed on one surface of the first inner current collector, and
   the outer electrode comprises an outer current collector and an outer electrode active material layer formed on one surface of the outer current collector.

6. The cable-form secondary battery according to claim 5, further comprising:
   a polymer film layer formed on at least one of the other surface of the first inner current collector and the other surface of the outer current collector.

7. The cable-form secondary battery according to claim 6, wherein the polymer film layer is formed of any one selected from the group consisting of polyolefin, polyester, polyimide and polyamide, or mixtures thereof.

8. The cable-form secondary battery according to claim 5, wherein a polymer support layer is further formed on a surface of at least one of the first inner electrode active material layer and the outer electrode active material layer.

9. The cable-form secondary battery according to claim 1, wherein the second inner electrode comprises a second inner current collector and a second inner electrode active material layer formed on both surfaces of the second inner current collector.

10. The cable-form secondary battery according to claim 9, wherein a polymer support layer is further formed on a surface of the second inner electrode active material layer.

11. The cable-form secondary battery according to claim 8, wherein the polymer support layer is a porous polymer layer having a pore size of from 0.01 µM to 10 µM and porosity of from 5% to 95%.

12. The cable-form secondary battery according to claim 8, wherein the polymer support layer comprises a polar linear polymer, an oxide-based linear polymer, or mixtures thereof.

13. The cable-form secondary battery according to claim 5, wherein a width and a length of the sheet-form inner separation layer and the outer separation layer are each larger than those of the first inner current collector and the outer current collector.

14. The cable-form secondary battery according to claim 5, wherein at least one of the first inner current collector and the outer current collector further comprises a primer coating layer comprising a conductive material and a binder.

15. The cable-form secondary battery according to claim 5, wherein a plurality of recesses are formed on one surface of at least one of the first inner current collector and the outer current collector.

16. The cable-form secondary battery according to claim 15, wherein the plurality of recesses have continuous patterns or intermittent patterns.

17. The cable-form secondary battery according to claim 16, wherein the continuous patterns are formed in a lengthwise direction, spaced apart from each other.

18. The cable-form secondary battery according to claim 16, wherein the intermittent patterns are formed of multiple holes.

19. The cable-form secondary battery according to claim 18, wherein the multiple holes are each circular or polygonal in shape.

20. The cable-form secondary battery according to claim 5, wherein at least one of the first inner current collector and the outer current collector is a film current collector or a mesh current collector.

21. The cable-form secondary battery according to claim 1, wherein the sheet-form first inner electrode, the sheet-form inner separation layer, the sheet-form second inner electrode, the sheet-form outer separation layer, and the sheet-form outer electrode have a strip structure extending in one direction.

22. The cable-form secondary battery according to claim 1, wherein the sheet-form first inner electrode, the sheet-form inner separation layer, the sheet-form second inner electrode, the sheet-form outer separation layer, and the sheet-form outer electrode are formed such that they are helically wound in non-overlapping turns.

23. The cable-form secondary battery according to claim 22, wherein the sheet-form first inner electrode, the sheet-form inner separation layer, the sheet-form second inner electrode, the sheet-form outer separation layer, and the sheet-form outer electrode are formed such that they are helically wound in non-overlapping turns, each turn spaced apart with a gap that is twice or less as large as a width of each of the sheet-form first inner electrode, the sheet-form inner separation layer, the sheet-form second inner electrode, the sheet-form outer separation layer, and the sheet-form outer electrode.

24. The cable-form secondary battery according to claim 1, wherein the sheet-form first inner electrode, the sheet-form inner separation layer, the sheet-form second inner electrode, the sheet-form outer separation layer, and the sheet-form outer electrode are formed such that they are helically wound in overlapping turns.

25. The cable-form secondary battery according to claim 24, wherein the sheet-form first inner electrode, the sheet-form inner separation layer, the sheet-form second inner electrode, the sheet-form outer separation layer, and the sheet-form outer electrode are formed such that they are helically wound with a width of an overlapping part 0.9 times or less as large as a width of each of the sheet-form first inner electrode, the sheet-form inner separation layer, the sheet-form second inner electrode, the sheet-form outer separation layer, and the sheet-form outer electrode.

26. The cable-form secondary battery according to claim 1, wherein the inner electrode support comprises at least two wires cross-wound helically.

27. The cable-form secondary battery according to claim 2, wherein an inner electrode current collector core, a lithium ion supplying core comprising an electrolyte, or a filling core is formed in the space formed within the inner electrode support.

28. The cable-form secondary battery according to claim 27, wherein the inner electrode current collector core is made of carbon nanotubes, stainless steel, aluminum, nickel, titanium, fired carbon or copper; stainless steel surface-treated with carbon, nickel, titanium or silver; an aluminum-cadmium alloy; a non-conductive polymer surface-treated with a conductive material; or a conductive polymer.

29. The cable-form secondary battery according to claim 27, wherein the lithium ion supplying core comprises a gel polymer electrolyte and a support.

30. The cable-form secondary battery according to claim 27, wherein the lithium ion supplying core comprises a liquid electrolyte and a porous carrier.

31. The cable-form secondary battery according to claim 27, wherein the filling core comprises a polymer resin, rubber, or an inorganic material, and the polymer resin, the rubber, or the inorganic material have a shape of a wire, a fiber, powder, a mesh, or a foam.

32. The cable-form secondary battery according to claim 1, wherein the first inner electrode and the outer electrode are a positive electrode and the second inner electrode is a negative electrode, or the first inner electrode and the outer electrode are a negative electrode and the second inner electrode is a positive electrode.

33. The cable-form secondary battery according to claim 1, further comprising:
a protective coating formed around an exterior of the cable-form secondary battery.

34. The cable-form secondary battery according to claim 33, wherein the protective coating further comprises a moisture barrier layer.

35. The cable-form secondary battery according to claim 34, wherein the moisture barrier layer is formed of aluminum or a liquid crystal polymer.

36. The cable-form secondary battery according to claim 1, wherein each of a sheet-form separation layer and a sheet-form electrode is formed by further winding one or more turns in a sequential order between the second inner electrode and the outer separation layer.

37. A cable-form secondary battery comprising:
a lithium ion supplying core comprising an electrolyte;
an inner electrode support with open structure formed around the lithium ion supplying core;
an inner electrode comprising a sheet-form first inner electrode formed such that it is helically wound on an exterior of the inner electrode support such that the sheet-form first inner electrode is outside the entire inner electrode support, a sheet-form inner separation layer formed such that it is helically wound on an exterior of the first inner electrode such that the sheet-form inner separation layer is outside the entire sheet-form first inner electrode, and a sheet-form second inner electrode formed such that it is helically wound on an exterior of the inner separation layer such that the sheet-form second inner electrode is outside the entire sheet-form inner separation layer;
an outer separation layer formed such that it is helically wound on an exterior of the inner electrode such that the outer separation layer is outside the entire inner electrode; and
an outer electrode formed such that it is helically wound on an exterior of the outer separation layer such that the outer electrode is outside the entire outer separation layer.

38. A cable-form secondary battery comprising:
at least two inner electrode supports arranged in parallel;
at least two inner electrodes, each comprising a sheet-form first inner electrode formed such that it is helically wound on an exterior of one of the at least two inner electrode supports such that the sheet-form first inner electrode is outside the entire one of the at least two inner electrode supports, a sheet-form inner separation layer formed such that it is helically wound on an exterior of the first inner electrode such that the sheet-form inner separation layer is outside the entire sheet-form first inner electrode, and a sheet-form second inner electrode formed such that it is helically wound on an exterior of the inner separation layer such that the sheet-form second inner electrode is outside the entire sheet-form inner separation layer;
an outer separation layer formed such that it is helically wound around an exterior of the at least two inner electrodes together such that the outer separation layer is outside the entire at least two inner electrodes; and
an outer electrode formed such that it is helically wound on an exterior of the outer separation layer such that the outer electrode is outside the entire outer separation layer.

39. The cable-form secondary battery of claim 38, further comprising:
at least two lithium ion supplying cores comprising an electrolyte, each disposed within one of the at least two inner electrode supports, wherein each of the at least two inner electrode supports has an open structure.

* * * * *